United States Patent
Oshino et al.

(10) Patent No.: US 11,837,855 B2
(45) Date of Patent: Dec. 5, 2023

(54) OUTER COVER BODY FOR ELECTRICAL WIRES AND OUTER-COVER-BODY-ATTACHED WIRE HARNESS

(71) Applicants: Furukawa Electric Co., Ltd., Tokyo (JP); Furukawa Automotive Systems Inc., Shiga (JP)

(72) Inventors: Takashi Oshino, Tokyo (JP); Koichi Maeno, Tokyo (JP); Naoyuki Kojima, Tokyo (JP); Hideyuki Ikeda, Tokyo (JP); Yoshikazu Kamei, Tokyo (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 16/765,767

(22) PCT Filed: Nov. 16, 2018

(86) PCT No.: PCT/JP2018/042429
§ 371 (c)(1),
(2) Date: May 20, 2020

(87) PCT Pub. No.: WO2019/102939
PCT Pub. Date: May 31, 2019

(65) Prior Publication Data
US 2020/0358270 A1    Nov. 12, 2020

(30) Foreign Application Priority Data
Nov. 21, 2017  (JP) ................................ 2017-223975

(51) Int. Cl.
*H02G 3/04* (2006.01)

(52) U.S. Cl.
CPC .................................. *H02G 3/045* (2013.01)

(58) Field of Classification Search
None
See application file for complete search history.

(56) References Cited

U.S. PATENT DOCUMENTS 3,485,937 A * 12/1969 Caveney ................ H02G 3/045
174/101
3,705,949 A * 12/1972 Weiss ..................... H02G 3/045
174/101

(Continued)

FOREIGN PATENT DOCUMENTS

| CN | 102239529 A | 11/2011 |
| CN | 102859818 A | 1/2013 |

(Continued)

OTHER PUBLICATIONS

DE2515573_translation (Year: 1976).*

(Continued)

*Primary Examiner* — Binh B Tran
*Assistant Examiner* — Muhammed Azam
(74) *Attorney, Agent, or Firm* — Dorsey & Whitney LLP

(57) ABSTRACT

An outer cover body for electrical wires, which is formed by bending a resin sheet and to be attached to an outer periphery of an electrical wire, includes a plurality of wall parts extending along an extending direction of the electrical wire and forming an accommodating part for accommodating the electrical wire. At least one of the plurality of wall parts includes a wall surface overlapping part having an outer side wall surface having a first notch, and an inner side wall surface overlapping the outer side wall surface and having a second notch. A branch line through-hole is formed by overlapping the first notch and the second notch.

12 Claims, 6 Drawing Sheets

(56) References Cited

U.S. PATENT DOCUMENTS

| | | | | |
|---|---|---|---|---|
| 3,761,603 | A | * | 9/1973 | Hays .................... H02G 3/045 174/101 |
| 3,890,459 | A | * | 6/1975 | Caveney ............... H02G 3/045 174/101 |
| 3,968,322 | A | * | 7/1976 | Taylor .................. H02G 3/045 174/72 A |
| 4,136,257 | A | * | 1/1979 | Taylor .................. H02G 3/045 174/68.3 |
| D282,538 | S | * | 2/1986 | Loot ......................... D13/155 |
| 6,254,041 | B1 | * | 7/2001 | Dufourg ............... H02G 3/045 174/19 |
| 6,921,571 | B2 | * | 7/2005 | Funakoshi .......... B29C 44/0407 296/1.08 |
| 7,049,508 | B2 | * | 5/2006 | Bushey ................ H02G 3/0425 174/481 |
| 7,060,893 | B1 | * | 6/2006 | Villi .................... H02G 3/0418 174/507 |
| 7,071,410 | B1 | * | 7/2006 | Kiely ..................... F16L 57/00 174/135 |
| 7,140,578 | B1 | * | 11/2006 | Robinett ............... F16L 3/1226 248/49 |
| 8,520,998 | B2 | * | 8/2013 | Reed .................... H02G 3/045 385/137 |
| 8,704,093 | B2 | * | 4/2014 | Asztalos .............. H02G 3/0418 174/68.3 |
| 9,036,368 | B2 | * | 5/2015 | Chen .................... H02G 3/045 361/826 |
| 9,742,166 | B2 | * | 8/2017 | Inao ..................... H01B 7/184 |
| 9,774,176 | B1 | * | 9/2017 | Spishock ................ H02G 3/32 |
| 10,050,425 | B2 | * | 8/2018 | Ojerstav .............. H02G 3/0456 |
| 10,131,293 | B2 | * | 11/2018 | Hida .................. B60R 16/0207 |
| 10,724,248 | B1 | * | 7/2020 | Morgan .............. E04F 13/0873 |
| 2003/0051892 | A1 | * | 3/2003 | Mattei .................... H02G 3/045 174/505 |
| 2007/0104927 | A1 | * | 5/2007 | Yabe ..................... C09J 7/38 428/40.1 |
| 2009/0050345 | A1 | * | 2/2009 | Delfosse ................ H02B 1/202 174/97 |
| 2009/0314512 | A1 | * | 12/2009 | Bing ...................... H02G 3/04 174/81 |
| 2011/0056722 | A1 | * | 3/2011 | Caveney ............... H02G 3/088 174/68.3 |
| 2012/0153093 | A1 | * | 6/2012 | Schmidt ................. H02G 3/04 248/68.1 |
| 2012/0273627 | A1 | * | 11/2012 | Fritz .................... H02G 3/0493 248/73 |
| 2012/0325519 | A1 | | 12/2012 | Igarashi et al. |
| 2015/0266435 | A1 | | 9/2015 | Wakabayashi |
| 2016/0013625 | A1 | | 1/2016 | Suzuki et al. |
| 2016/0368436 | A1 | * | 12/2016 | Wakabayashi ...... B60R 16/0215 |
| 2019/0013654 | A1 | | 1/2019 | Suenaga |
| 2020/0027628 | A1 | * | 1/2020 | Ikeda ..................... H01B 7/24 |
| 2020/0343708 | A1 | * | 10/2020 | Kamei .................. H02G 3/0406 |
| 2020/0358270 | A1 | * | 11/2020 | Oshino ................... F16L 57/00 |
| 2020/0362993 | A1 | * | 11/2020 | Li ......................... F16L 3/2235 |
| 2020/0406839 | A1 | * | 12/2020 | Takakura ............... F16L 57/00 |
| 2021/0021112 | A1 | * | 1/2021 | Oshino ................. H02G 3/0487 |

FOREIGN PATENT DOCUMENTS

| | | | | |
|---|---|---|---|---|
| CN | 107069596 | A | * | 8/2017 ............. B60R 16/02 |
| CN | 206640230 | U | | 11/2017 |
| DE | 1098070 | B | * | 1/1961 ............. H02G 3/045 |
| DE | 1112771 | B | * | 8/1961 ............. H02G 3/045 |
| DE | 1154164 | B | * | 9/1963 ............. H02G 3/045 |
| DE | 1440237 | A1 | * | 10/1968 ............ H02G 3/045 |
| DE | 1590764 | A1 | * | 6/1970 ............. H02G 3/045 |
| DE | 2058781 | A1 | * | 6/1972 ............. H02G 3/045 |
| DE | 2408095 | A1 | * | 8/1975 ............ H02G 3/0425 |
| DE | 2515573 | A1 | * | 4/1976 ............. H02G 3/045 |
| DE | 3742448 | A1 | * | 6/1989 ............. H02G 3/045 |
| DE | 9109005 | U1 | * | 9/1991 ............. H02G 3/045 |
| DE | 4205293 | A1 | * | 8/1993 .............. H02B 1/202 |
| DE | 19732595 | A1 | * | 3/1998 ............. B29C 47/003 |
| DE | 102006002909 | A1 | * | 9/2006 ........... B60R 16/0215 |
| EP | 0642906 | A2 | * | 3/1995 ........... B60R 16/0215 |
| EP | 0886357 | A2 | * | 12/1998 ............ B29C 44/12 |
| EP | 0886358 | A2 | * | 12/1998 ........... B60R 16/0207 |
| EP | 2975711 | A1 | * | 1/2016 ............. H02G 3/0437 |
| EP | 2978089 | A2 | * | 1/2016 ............. H02G 3/0418 |
| FR | 1177110 | A | * | 4/1959 ............. H02G 3/045 |
| FR | 1213786 | A | * | 4/1960 ............. H02G 3/045 |
| FR | 1224204 | A | * | 6/1960 ............. H02G 3/045 |
| FR | 2853150 | A1 | * | 10/2004 ............ H02G 3/0418 |
| JP | H0541328 | U | | 6/1993 |
| JP | H08196016 | A | | 7/1996 |
| JP | H092814 | A | | 1/1997 |
| JP | H0928014 | A | | 1/1997 |
| JP | H1014051 | A | * | 1/1998 |
| JP | H11155218 | A | | 6/1999 |
| JP | H11205943 | A | * | 7/1999 |
| JP | 2003204616 | A | | 7/2003 |
| JP | 2013162642 | A | | 8/2013 |
| JP | 2013255410 | A | * | 12/2013 ........... B60R 16/0215 |
| JP | 201450283 | A | | 3/2014 |
| JP | 2015153492 | A | | 8/2015 |
| JP | 2015231248 | A | | 12/2015 |
| JP | 2016129149 | A | | 7/2016 |
| JP | 2016201240 | A | | 12/2016 |
| JP | 2017011813 | A | | 1/2017 |
| JP | 6310608 | B1 | * | 4/2018 ........... B60R 16/0215 |
| KR | 960004164 | Y1 | * | 5/1996 |
| KR | 100838148 | B1 | * | 6/2008 ........... B60R 16/0215 |
| KR | 20080003274 | U | * | 8/2008 |
| KR | 20080004801 | U | * | 10/2008 |
| KR | 20160011041 | A | * | 1/2016 |
| KR | 101668347 | B1 | * | 10/2016 |
| WO | WO-9910206 | A1 | * | 3/1999 ........... B60R 16/0207 |
| WO | WO-9911492 | A1 | * | 3/1999 ............ B29C 44/12 |
| WO | WO-2012096107 | A1 | * | 7/2012 ........... B60R 16/0215 |
| WO | WO-2013122224 | A1 | * | 8/2013 ........... B60R 16/0215 |
| WO | WO-2015016213 | A1 | * | 2/2015 ........... B60R 16/0215 |
| WO | 2016044826 | A1 | | 3/2016 |
| WO | WO-2020066594 | A1 | * | 4/2020 ........... B60R 16/0215 |
| WO | WO-2020170559 | A1 | * | 8/2020 ........... B60R 16/0215 |
| WO | WO-2020240951 | A1 | * | 12/2020 ............. H01B 7/00 |
| WO | WO-2022259908 | A1 | * | 12/2022 |

OTHER PUBLICATIONS

International Search Report and Written Opinion (EN translation of ISR only) for PCT Application No. PCT/JP2018/042429, dated Jan. 22, 2019.

English translation of International Preliminary Report on Patentability for Application No. PCT/JP2018/042429, dated May 26, 2020.

English translation of Written Opinion for Application No. PCT/JP2018/042429, dated Jan. 22, 2019.

English translation of Office Action for on Application No. 201880069236.7, dated Oct. 16, 2020.

English Translation of 2nd Office Action dated Sep. 1, 2021 for Chinese Application No. 201880069236.7.

Extended European Search Report dated Jul. 2, 2021 for EP Application No. 18881539.3.

"English Translation" Notice of Reasons for Refusal, dated May 10, 2021, JP Application No. 2017-223975.

[English Translation] Decision of Rejection dated Jan. 13, 2022 for Chinese Patent Application No. 201880069236.7; pp. all.

[English Translation] "Chemical Products International Trade Real Manual", A Practical Handbook for International Trade in Chemical Products "A Practical Handbook for International Trade in Chemical Products", Beijing: Chemical Industry Press, Chemical Industry Publishing Co., Ltd., ISBN 7-5025-1798-7, Jul. 1997, pp. all.

[English Translation] Wang, Lan , et al., "Polymer Materials", China Light Industry Press, Textbook series on polymer materials and engineering General Higher Education "Eleventh Five-Year" National Planning Textbook; ISBN 978-5019-6654-7; Published by China Light Industry Press, Jan. 2009; pp. all.

(56) References Cited

OTHER PUBLICATIONS

Communication Pursuant to Article 94(3) EPC for European Patent Application No. 18881539.3 dated Jun. 12, 2023, pp. all.

* cited by examiner

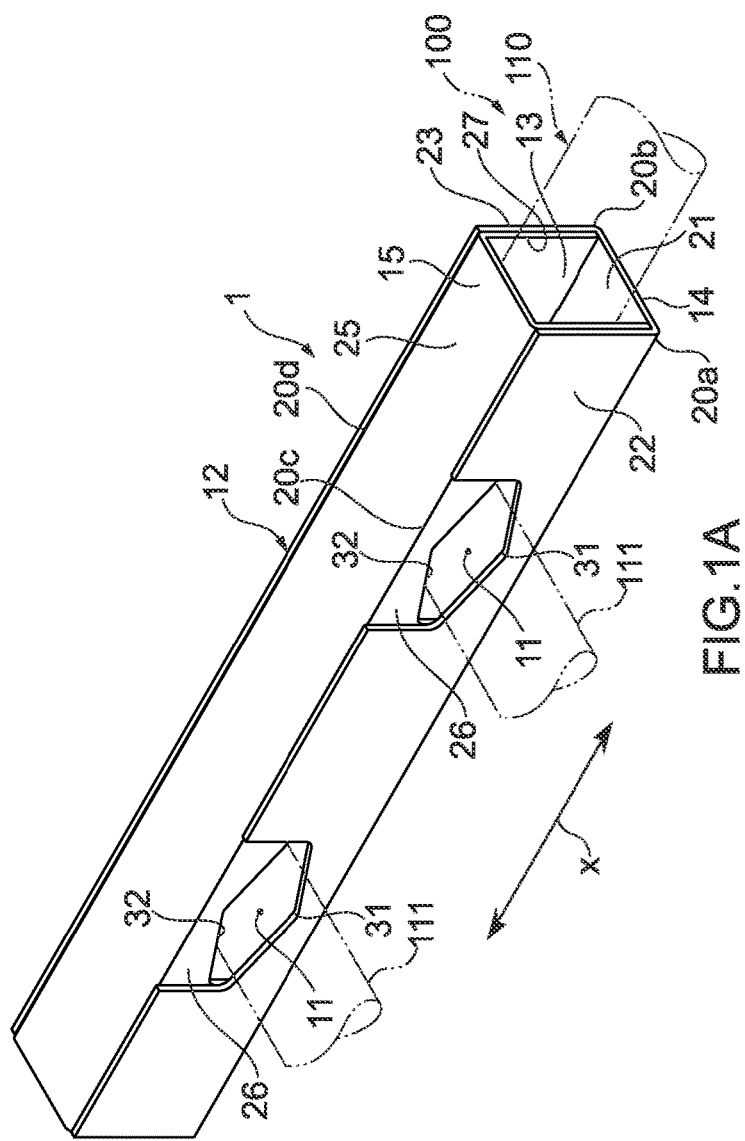
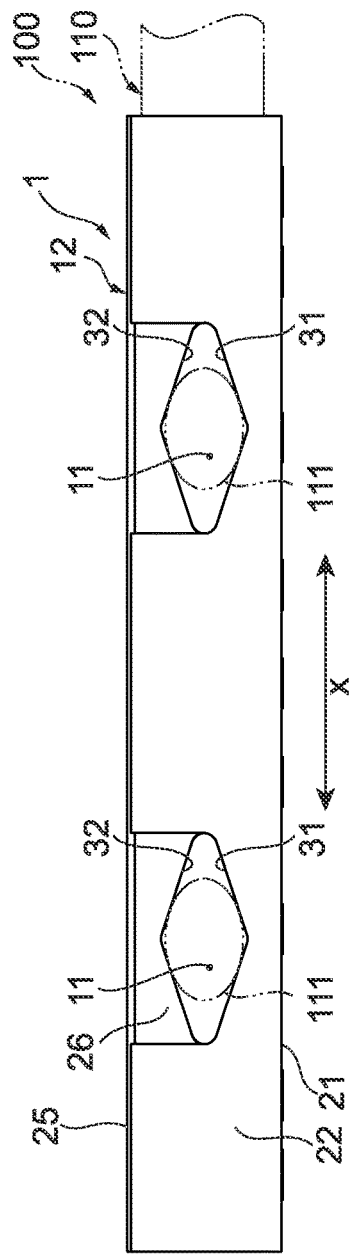
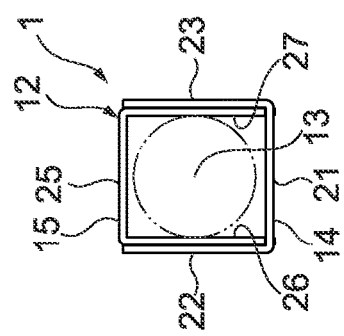
FIG.1A
FIG.1B
FIG.1C

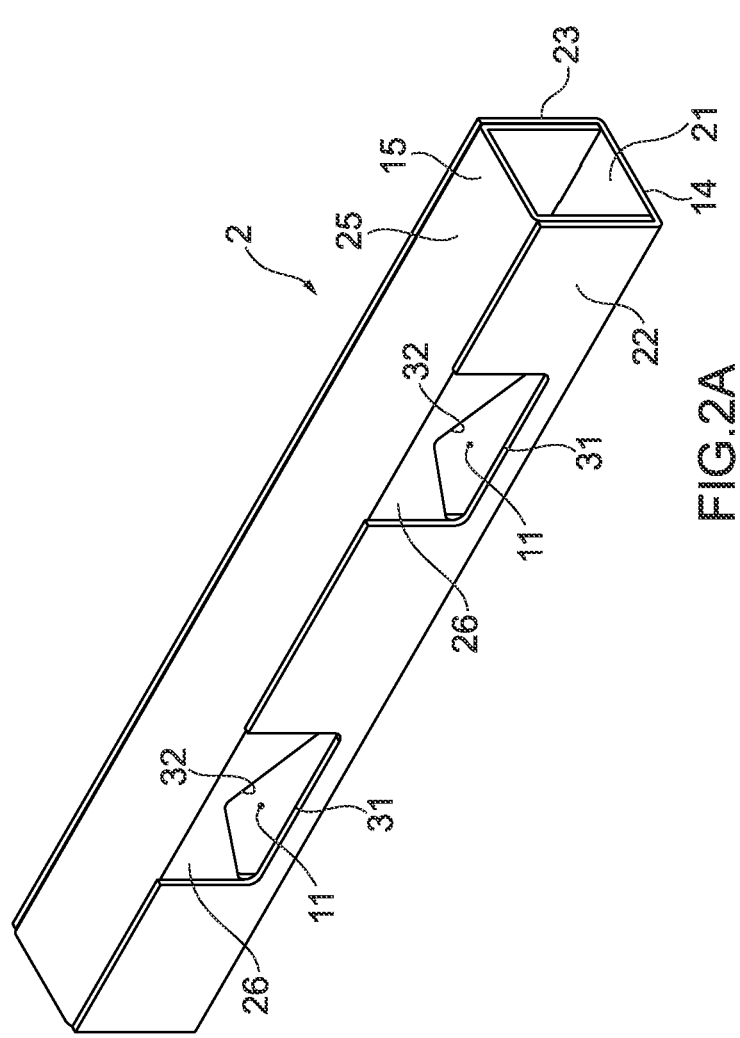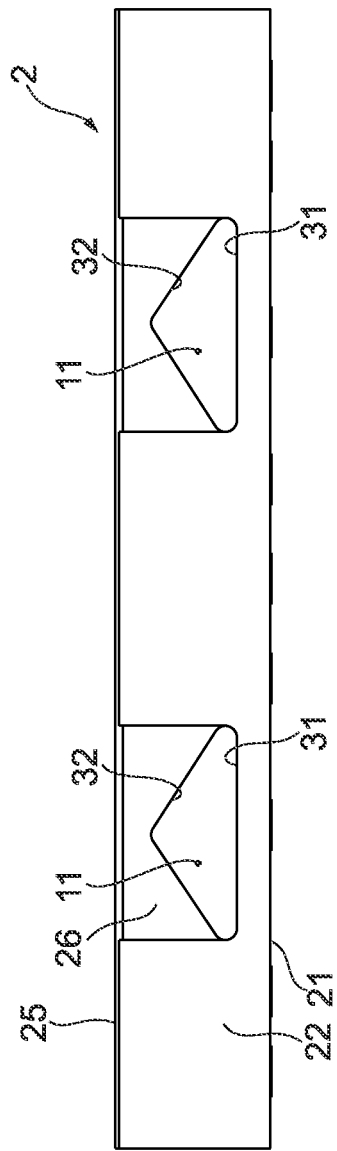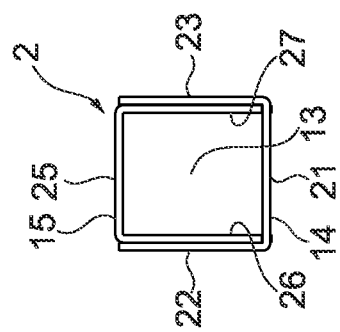
FIG.2A
FIG.2B
FIG.2C

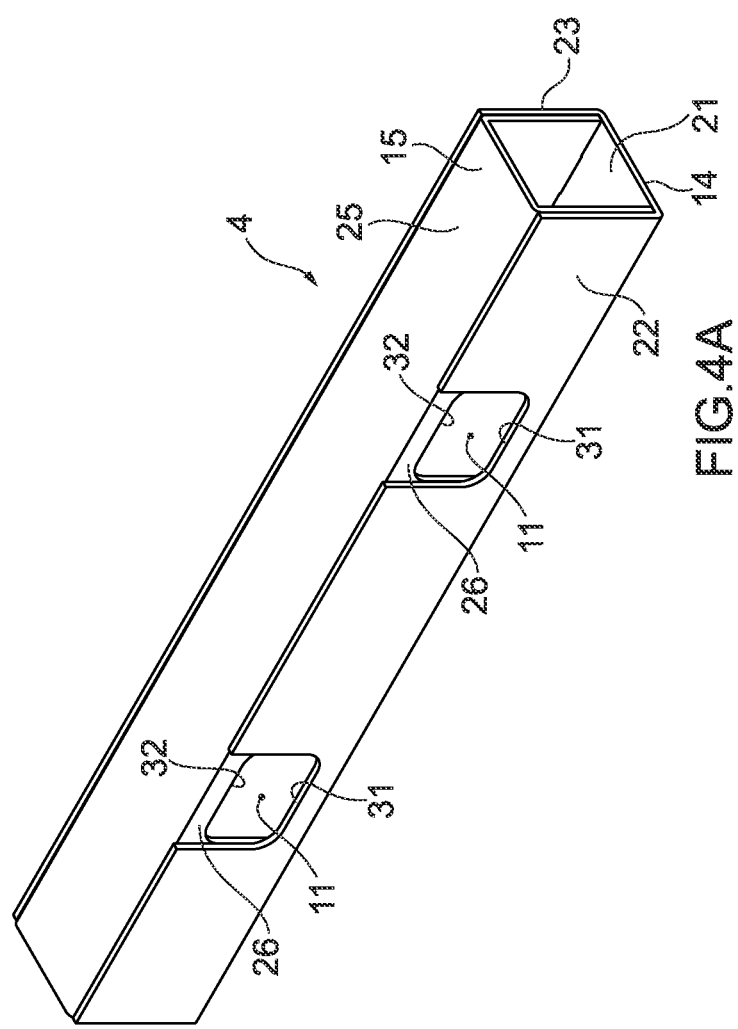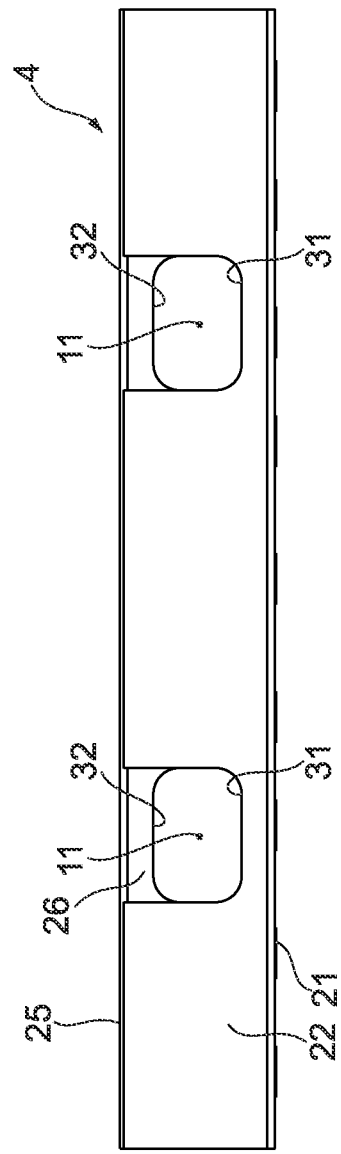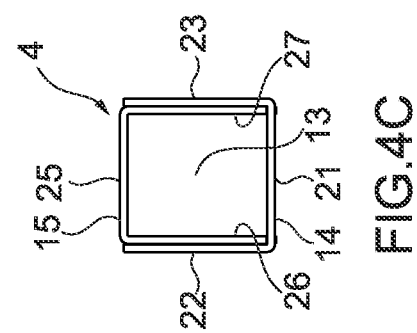

OUTER COVER BODY FOR ELECTRICAL WIRES AND OUTER-COVER-BODY-ATTACHED WIRE HARNESS

CROSS-REFERENCE TO RELATED APPLICATION(S)

This application is a U.S. National Stage of International Patent Application No. PCT/JP2018/042429 filed on Nov. 16, 2018, which claims priority to Japanese Patent Application No. 2017-223975, filed on Nov. 21, 2017. The contents of these applications are incorporated herein by reference in their entirety.

Technical Field

The present invention relates to an outer cover body for electrical wires that is attached to the outer periphery of an electrical wire such as a wire harness, and an outer-cover-body-attached wire harness.

BACKGROUND ART

In some cases, a branch portion is formed in an electrical wire to be routed in a vehicle or the like, and the electrical wire is branched at the branch portion. As an outer cover body for electrical wires to be attached to the outer periphery of an electrical wire having a branch portion, an electrical wire protection member having a branch line hole formed in an electrical wire side wall part has been proposed (Patent Literature 1). In Patent Literature 1, the branch line hole is a branch hole through which a branch line part branched from a main line part is passed, and the branch line part is pulled out from the branch line hole.

However, in the branch line hole of Patent Literature 1, in order to pass the branched electrical wire to the branch line hole, it is necessary to successively feed the tip to the branch portion of the branched electrical wire to the branch line hole. Thus, in the branch line hole of Patent Literature 1, there is a problem that the work of passing the branched electrical wire is complicated.

Moreover, in some cases, the tip of the electrical wire is provided a connector member for connection in advance, and, in general, the external dimension of the connector member is larger than the external diameter of the electrical wire. Therefore, in Patent Literature 1, it is necessary to set the dimension of the branch line hole to be larger than the external diameter of the branched electrical wire. Hence, there is a problem that position control of the branched electrical wire passed to the branch line hole may not be sufficient.

DOCUMENT LIST

Patent Literature

Patent Literature 1: Japanese Patent Application Publication No. 2015-231248

SUMMARY OF INVENTION

Technical Problem

In consideration of the above-described circumstances, it is an object of the present invention to provide an outer cover body for electrical wires that facilitates the work of passing a branched electrical wire, does not require the dimension of a hole for passing the branched electrical wire to be set larger than the external diameter of the branched electrical wire, and has excellent position control of the electrical wire passed to the hole for passing the branched electrical wire.

Solution to Problem

An outline of the configuration of the present invention is as follows.

[1] An outer cover body for electrical wires, the outer cover body for electrical wires being formed by bending a resin sheet and to be attached to an outer periphery of an electrical wire, the outer cover body for electrical wires including a plurality of wall parts extending along an extending direction of the electrical wire and forming an accommodating part for accommodating the electrical wire, wherein at least one of the plurality of wall parts includes a wall surface overlapping part having an outer side wall surface having a first notch, and an inner side wall surface overlapping the outer side wall surface and having a second notch, a branch line through-hole being formed by overlapping the first notch and the second notch.

[2] The outer cover body for electrical wires disclosed in [1], wherein the resin sheet is a thermoplastic resin foam sheet.

[3] The outer cover body for electrical wires disclosed in [1] or [2], wherein the outer side wall surface is a separate member from the inner side wall surface.

[4] The outer cover body for electrical wires disclosed in any one of [1] to [3], wherein an edge portion of the outer side wall surface faces an edge portion of the inner side wall surface along the extending direction of the electrical wire.

[5] The outer cover body for electrical wires disclosed in any one of [1] to [4], wherein the branch line through-hole is not in contact with a bending portion of the resin sheet.

[6] The outer cover body for electrical wires disclosed in [5], wherein an edge of the branch line through-hole is separated from the bending portion by not less than 5 mm.

[7] The outer cover body for electrical wires disclosed in any one of [1] to [6], wherein a shape of the branch line through-hole is a rhombus, a triangle, a circle, a rectangle, or an ellipse.

[8] The outer cover body for electrical wires disclosed in any one of [1] to [6], wherein a corner portion of the branch line through-hole has a round shape.

[9] The outer cover body for electrical wires disclosed in [8], wherein the round shape has a curved portion with R of not less than 2.0 mm.

[10] An outer-cover-body-attached wire harness including: one or more electrical wires; and the outer cover body for electrical wires disclosed in any one of [1] to [9], wherein the outer cover body for electrical wires is attached to the outer periphery of the electrical wire.

Effects of Invention

According to a mode of the outer cover body for electrical wires of the present invention, by overlapping the outer side wall surface having the first notch and the inner side wall surface having the second notch, the first notch and the second notch overlap each other, and the branch line through-hole is formed in the wall parts, thereby facilitating the work of passing the branched electrical wire (branch line) to the branch line through-hole. Moreover, according to the mode of the outer cover body for electrical wires, the dimension of the branch line through-hole does not need to be set larger than the external diameter of the branched electrical wire, and excellent position control is exhibited over the electrical wire passed to the branch line through-hole.

According to a mode of the outer cover body for electrical wires of the present invention, since the resin sheet that forms the outer cover body for electrical wires is a thermoplastic resin foam sheet, it is possible to achieve a reduction in weight of the outer cover body for electrical wires.

According to a mode of the outer cover body for electrical wires of the present invention, since the edge portion of the outer side wall surface faces the edge portion of the inner side wall surface along the extending direction of the electrical wire, the work of passing the branched electrical wire to the branch line through-hole is further facilitated.

According to a mode of the outer cover body for electrical wires of the present invention, since the branch line through-hole is not in contact with the bending portion of the resin sheet, deformation due to buckling or the like of the outer cover body for electrical wires is prevented, and the strength of the outer cover body for electrical wires in longitudinal direction is improved.

According to a mode of the outer cover body for electrical wires of the present invention, since the corner portion of the branch line through-hole has a round shape, concentration of stress on the corner portion of the branch line through-hole is prevented, and the strength of the outer cover body for electrical wires in the longitudinal direction is improved.

BRIEF DESCRIPTION OF DRAWINGS

FIG. 1A A perspective view of an outer cover body for electrical wires according to a first embodiment of the present invention.

FIG. 1B A side view of the outer cover body for electrical wires according to the first embodiment of the present invention.

FIG. 1C A front view of the outer cover body for electrical wires according to the first embodiment of the present invention.

FIG. 2A A perspective view of an outer cover body for electrical wires according to a second embodiment of the present invention.

FIG. 2B A side view of the outer cover body for electrical wires according to the second embodiment of the present invention.

FIG. 2C A front view of the outer cover body for electrical wires according to the second embodiment of the present invention.

FIG. 4A A perspective view of an outer cover body for electrical wires according to a fourth embodiment of the present invention.

FIG. 4B A side view of the outer cover body for electrical wires according to the fourth embodiment of the present invention.

FIG. 4C A front view of the outer cover body for electrical wires according to the fourth embodiment of the present invention.

DESCRIPTION OF EMBODIMENTS

Figure 3A:
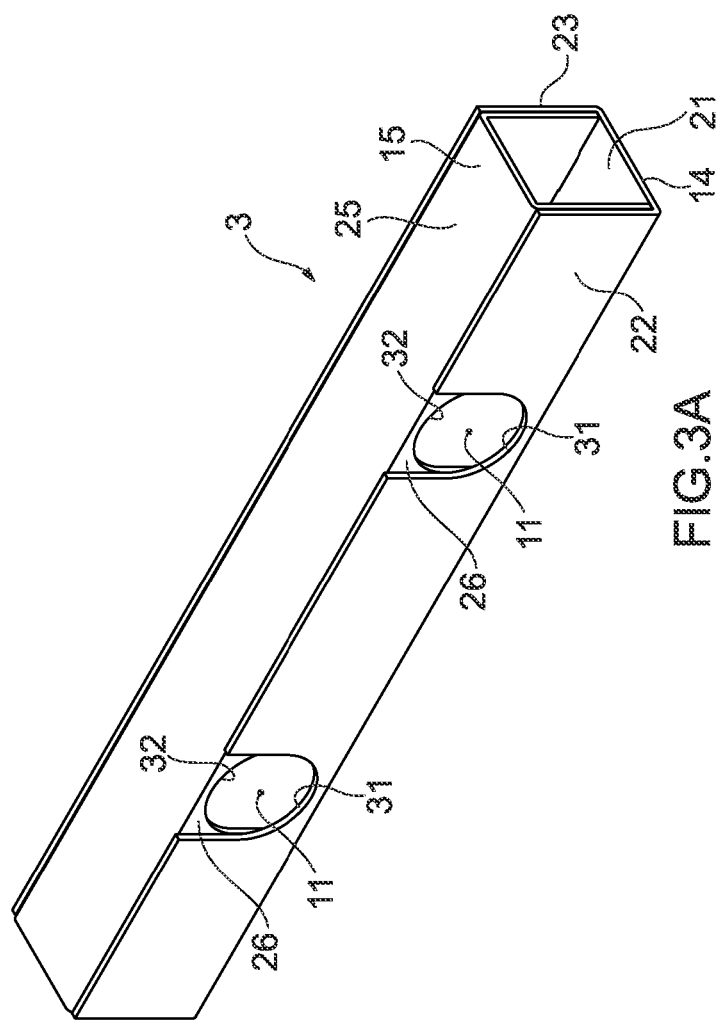
FIG. 3A A perspective view of an outer cover body for electrical wires according to a third embodiment of the present invention.

Hereinafter, an outer cover body for electrical wires according to an embodiment of the present invention will be described using the drawings.

First, an embodiment of an outer-cover-body-attached wire harness using an outer cover body for electrical wires according to the first embodiment of the present invention will be described using FIGS. 1A-C. An outer-cover-body-attached wire harness 100 according to the embodiment of the present invention has a wire harness 110 including a plurality of electrical wires bundled together, and an outer cover body for electrical wires 1 according to the first embodiment that is attached to the outer periphery of the wire harness 110. The wire harness 110 is protected from the external environment by the outer cover body for electrical wires 1.

As shown in FIG. 1A, the wire harness 110 has electrical wires (branch lines) 111 branched from branch portions, and the branch lines 111 are pulled out from branch line through-holes 11 of the outer cover body for electrical wires 1. In FIGS. 1A and 1B, although each of the wire harness 110 and the branch lines 111 is shown as a single cylindrical shape, each of the wire harness 110 and the branch lines 111 includes one or more electrical wires.

Thereafter, the outer cover body for electrical wires 1 according to the first embodiment of the present invention will be described.

As shown in FIG. 1A, the outer cover body for electrical wires 1 includes a plurality of wall parts 12 extending along an extending direction of the wire harness 110 (longitudinal direction x in FIGS. 1A and 1B), and has an accommodating part 13 that is formed by being surrounded by the plurality of wall parts 12 and accommodates the wire harness 110. As shown in FIG. 1C, in the outer cover body for electrical wires 1, the cross-sectional shape in a short-side direction is quadrangular shape.

As shown in FIG. 1A, in the outer cover body for electrical wires 1 according to the first embodiment, the plurality of wall parts 12 are formed from a first wall member 14, and a second wall member 15 that is a separate member from the first wall member 14. The first wall member 14 is formed by bending one resin sheet (for example, a thermoplastic resin foam sheet). The first wall member 14 has a bottom wall part 21, an outer side-wall part 22 continuously formed from an edge of the bottom wall part 21 via a bending portion 20a, and an outer side-wall part 23 continuously formed from an edge of the bottom wall part 21 via a bending portion 20b by bending the bending portions 20a, 20b. The first wall member 14 has a U-shape in a front view.

Like the first wall member 14, the second wall member 15 is formed by bending one resin sheet (for example, a thermoplastic resin foam sheet). The second wall member 15 has a lid wall part 25, an inner side-wall part 26 continuously formed from an edge of the lid wall part 25 via a bending portion 20c, and an inner side-wall part 27 continuously formed from an edge of the lid wall part 25 via a bending portion 20d by bending the bending portions 20c, 20d. The second wall member 15 has a U-shape in the front view.

That is, in the outer cover body for electrical wires 1, the plurality of wall parts 12 are formed by fitting the second wall member 15 having a U-shape in the front view into the first wall member 14 having a U-shape in the front view so that the bottom wall part 21 and the lid wall part 25 face each other. The outer side-wall part 22 and the inner side-wall part 26 overlap each other to form a wall surface overlapping part, and the outer side-wall part 23 and the inner side-wall part 27 overlap each other to form a wall surface overlapping part. In the outer cover body for electrical wires 1, the outer side-wall part 22 and the inner side-wall part 26 overlap and contact each other, and also the outer side-wall part 23 and the inner side-wall part 27 overlap and contact each other. The edge portion of the inner side-wall part 26 reaches the bending portion 20a of the bottom wall part 21, and the edge portion of the inner side-wall part 27 reaches the bending portion 20b of the bottom wall part 21. The edge portion of the outer side-wall part 22 reaches the bending portion 20c of the lid wall part 25, and the edge portion of the outer side-wall part 23 reaches the bending portion 20d of the lid wall part 25.

The edge portion of the outer side-wall part 22 faces the edge portion of the inner side-wall part 26 along the extending direction of the wire harness 110. The edge portion of the outer side-wall part 23 faces the edge portion of the inner side-wall part 27 along the extending direction of the wire harness 110.

As shown in FIG. 1A, the accommodating part 13 is a part surrounded by the bottom wall part 21, the inner side-wall parts 26, 27, the outer side-wall parts 22, 23, and the lid wall part 25. The accommodating part 13 is formed by the bottom wall part 21, the inner side-wall parts 26, 27, the outer side-wall parts 22, 23, and the lid wall part 25 into a cylindrical shape with a through-hole from one side to the other side in the longitudinal direction x, and can accommodate the wire harness 110.

As shown in FIGS. 1A and 1B, on the outer side-wall part 22 that is an outer side wall surface, a first notch 31 is provided from the edge portion toward the bending portion 20a. In the outer cover body for electrical wires 1, a plurality of (two in FIGS. 1A and 1B) first notches 31 are provided. Moreover, on the inner side-wall part 26 that is an inner side wall surface overlapping the outer side-wall part 22, a second notch 32 is provided from the edge portion toward the bending portion 20c. The second notch 32 is provided at a position where at least a part of the area of the second notch 32 overlaps at least a part of the area of the first notch 31. In the outer cover body for electrical wires 1, a plurality of (two in FIG. 1) second notches 32 are provided corresponding to the plurality of first notches 31 that are provided. Although the shapes and dimensions of the first notch 31 and the second notch 32 are not particularly limited, in FIGS. 1A and 1B, the first notch 31 and the second notch 32 mutually have the same shape and the same dimension. A branch line through-hole 11 is formed by arranging the first notch 31 and the second notch 32 to overlap each other. Hence, the first notch 31 and the second notch 32 are provided at the position for pulling out the branch line 111.

The shape of the branch line through-hole 11 is not particularly limited, and can be appropriately selected, for example, in accordance with the shape and dimension of the branch line 111 in the short-side direction, and is substantially rhombus in the outer cover body for electrical wires 1.

The first notch 31 does not reach the bending portion 20a. The second notch 32 does not also reach the bending portion 20c. From the above, the branch line through-hole 11 is not in contact with the bending portions 20a, 20c of the resin sheets. That is, the branch line through-hole 11 is not in contact with the bottom wall part 21 and the lid wall part 25. Therefore, an area of the inner side-wall part 26 between the bottom of the second notch 32 and the bending portion 20c is exposed to the outside. Since the branch line through-hole 11 is not in contact with the bending portions 20a, 20c, deformation due to buckling or the like of the outer cover body for electrical wires 1 is prevented, and the strength of the outer cover body for electrical wires 1 in the longitudinal direction x is improved. In the outer cover body for electrical wires 1, the edge of the branch line through-hole 11 is separated from the bending portions 20a, 20c by not less than 5 mm. Thus, even in a portion where the branch line through-hole 11 is present, the outer side-wall part 22 and the inner side-wall part 26 can be easily bent at the bending portions 20a, 20c.

As shown in FIG. 1B, a round shape is formed at the corner portions of the branch line through-hole 11. Since the corner portions of the branch line through-hole 11 have the round shape, concentration of stress on the corner portions of the branch line through-hole 11 is prevented, and the strength of the outer cover body for electrical wires 1 in the longitudinal direction x is improved. The radius of curvature of the round shape is not particularly limited, but R of not less than 2.0 mm is preferred, and R of not less than 3.0 mm is particularly preferred. Further, the radius of curvature of the round shape is preferably R of not more than 20 mm, and particularly preferably R of not more than 10 mm. From the above, it is preferable that the round shape have a curved portion with R of not less than 2.0 mm.

The resin sheet to be used for the outer cover body for electrical wires 1 is not particularly limited as long as the resin sheet is bendable, and either of a thermoplastic resin sheet and a thermosetting resin sheet can be used. Among various resin sheets, a thermoplastic resin foam sheet is preferable in the aspects of lightness in weight, the degree of freedom in designing shapes, cost, and so on. The type of resin for the thermoplastic resin foam sheet is not particularly limited as long as the resin is a thermoplastic resin, and it is possible to use any of thermoplastic resins including, for example, polyethylene resin, polypropylene resin, polycarbonate resin, polyethylene terephthalate resin, polybutylene terephthalate resin, poly-amide resin, polyphenylene sulfide resin, polystyrene resin, polyvinyl chloride resin, polyvinyl acetate resin, polytetrafluoroethylene resin, and acrylic resin.

The density of the thermoplastic resin foam sheet to be used for the outer cover body for electrical wires 1 is not particularly limited, but is preferably not less than 200 $Kg/m^3$ and not more than 1000 $Kg/m^3$ in order to improve the degree of freedom in designing the outer cover body for electrical wires 1 by preventing anisotropy in mechanical properties or having isotropy in mechanical properties, and is more preferably not less than 300 $Kg/m^3$ and not more than 600 $Kg/m^3$, and particularly preferably not less than 350 $Kg/m^3$ and not more than 550 $Kg/m^3$ in order to further improve the balance between lightness in weight and mechanical strength, for example.

Figure 6:
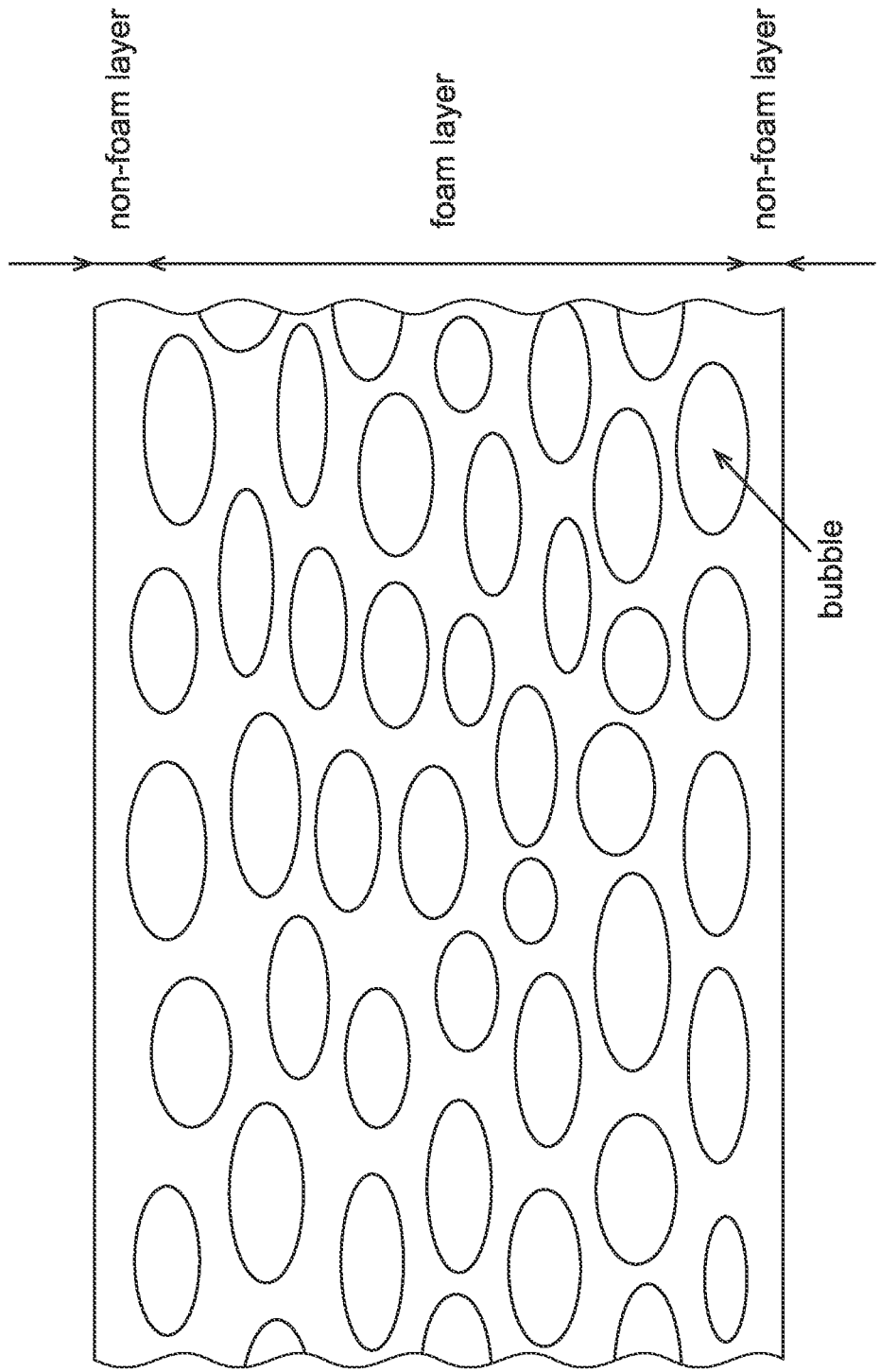
FIG. 6 A cross-sectional view of the thermoplastic resin foam sheet according to an embodiment of the present invention.

The thickness of the thermoplastic resin foam sheet is not particularly limited, but is preferably not less than 0.80 mm and not more than 5.0 mm, and particularly preferably not less than 1.0 mm and not more than 2.5 mm in order to further improve the balance between ease of bending and mechanical strength, for example. Further, a non-foam layer may be formed on both surfaces or one surface of the thermoplastic resin foam sheet. That is, the thermoplastic resin foam sheet may have a structure including a foam layer, and a non-foam layer formed on the front surface of the foam layer, as shown in FIG. 6. Since the non-foam layer is formed on the front surface of the thermoplastic resin foam sheet, the mechanical strength of the outer cover body for electrical wires 1 is improved, the protection performance for the wire harness 110 to be accommodated is further improved, and the abrasion resistance of the outer cover body for electrical wires 1 is improved and thereby excellent durability is obtained. The thickness of the non-foam layer is not particularly limited, but, for example, is not less than 10 μm and not more than 100 μm.

The bubble number density in the foam layer of the thermoplastic resin foam sheet is not particularly limited, but the lower limit of the bubble number density is preferably not less than 800 bubbles/$mm^3$, and particularly preferably not less than 1000 bubbles/$mm^3$ in order to more reliably prevent anisotropy in mechanical properties and further improve the degree of freedom in design. On the other hand, the upper limit of the bubble number density is not more than $10^{10}$ bubbles/$mm^3$ in order to obtain excellent mechanical strength. For the bubble number density in the present invention, an SEM photograph of a longitudinal section of the thermoplastic resin foam sheet was taken, the number n of bubbles existing in an arbitrary 100×100 μm area in the foam layer was counted on the SEM photograph, and the number of bubbles existing in per 1 $mm^2$ was calculated. By raising the obtained numerical value to the power of 3/2 to convert into the number of bubbles per 1 $mm^3$, the bubble number density was obtained.

Thereafter, a method for forming the outer-cover-body-attached wire harness 100 by placing the wire harness 110 having the branch line 111 branched from a main line in the outer cover body for electrical wires 1 will be described.

First, a cutting process of cutting out each of a portion corresponding to the first wall member 14 constituting the outer cover body for electrical wires 1 and a portion corresponding to the second wall member 15 as a separate member from the first wall member 14 from a resin sheet (for example, a thermoplastic resin foam sheet) serving as a base material for forming the outer cover body for electrical wires 1 is performed.

Thereafter, the outer side-wall part 23 and the bottom wall part 21 are formed by bending the resin sheet serving as the first wall member 14, at the bending portion 20b, so that the outer side-wall part 23 is substantially perpendicular to the bottom wall part 21. Thereafter, the inner side-wall part 27 and the lid wall part 25 are formed by bending the resin sheet serving as the second wall member 15, at the bending portion 20d, so that the inner side-wall part 27 is substantially perpendicular to the lid wall part 25. Thereafter, the inner side-wall part 27 and the outer side-wall part 23 are arranged to overlap each other to form a wall surface overlapping part, and the inner side-wall part 27 and the outer side-wall part 23 are joined together. Examples of means for joining the inner side-wall part 27 and the outer side-wall part 23 together include adhesive means such as an adhesive and an adhesive tape, welding means such as ultrasonic welding and heat welding, fitting means using a locking member, a rivet or the like, pierce fastening means using a stapler or the like. This provides a shape with an opening along the longitudinal direction x between the bottom wall part 21 and the lid wall part 25.

Thereafter, the wire harness 110 having the branch line 111 is inserted from between the bottom wall part 21 and the lid wall part 25. Subsequently, the inner side-wall part 26 is formed by bending the resin sheet serving as the second wall member 15, at the bending portion 20c, so that the inner side-wall part 26 is substantially parallel to the inner side-wall part 27. The vicinity of the branch portion of the branch line 111 is accommodated in the second notch 32 when bending the resin sheet at the bending portion 20c. Furthermore, the outer side-wall part 22 is formed to overlap the inner side-wall part 26 by bending the resin sheet serving as the first wall member 14, at the bending portion 20a, so that the outer side-wall part 22 is substantially parallel to the outer side-wall part 23. The vicinity of the branch portion of the branch line 111 accommodated in the second notch 32 is also accommodated in the first notch 31 when bending the resin sheet at the bending portion 20a. Since the vicinity of the branch portion of the branch line 111 is accommodated in the second notch 32 and in the first notch 31, the vicinity of the branch portion of the branch line 111 is accommodated in the branch line through-hole 11.

Thereafter, the inner side-wall part 26 and the outer side-wall part 22 are joined together using the above-described joining means or the like. Consequently, the wire harness 110 is inserted through and accommodated in the accommodating part 13 in a state in which the branch line 111 is pulled out from the branch line through-hole 11.

In the outer cover body for electrical wires 1, since the branch line 111 can be passed to the branch line through-hole 11 without feeding the tip to the branch portion of the branch line 111 successively to the branch line through-hole 11, the work of passing the branch line 111 to the branch line through-hole 11 is facilitated. Moreover, in the outer cover body for electrical wires 1, since the branch line 111 can be passed to the branch line through-hole 11 without inserting the tip of the branch line 111 into the branch line through-hole 11, the dimension of the branch line through-hole 11 does not need to be set larger than the external diameter of the branched electrical wire, and excellent position control is exhibited over the branch line 111 passed to the branch line through-hole 11.

Thereafter, an outer cover body for electrical wires according to the second embodiment of the present invention will be described. It should be noted that the same components as the components constituting the outer cover body for electrical wires according to the first embodiment of the present invention will be described using the same reference signs.

As shown in FIGS. 2A-C, in an outer cover body for electrical wires 2 according to the second embodiment, the shape of the branch line through-hole 11 is a substantially triangle. In the outer cover body for electrical wires 2, the shape of the first notch 31 is a different form from the shape of the second notch 32. The first notch 31 has a rectangular shape, and a bottom part which is in the form of a straight line forms the bottom side of the branch line through-hole 11 in the shape of a substantially triangle. On the other hand, a bottom part of the second notch 32 forms two slanting sides of the branch line through-hole 11 in the shape of a substantially triangle. In the outer cover body for electrical wires 2, since the branch line can be passed to the branch line through-hole 11 without feeding the tip to the branch portion of the branch line successively to the branch line through-hole 11, the work of passing the branch line to the branch line through-hole 11 can also be facilitated.

Thereafter, an outer cover body for electrical wires according to the third embodiment of the present invention will be described. It should be noted that the same components as the components constituting the outer cover body for electrical wires according to the first and second embodiments of the present invention will be described using the same reference signs.

Figure 3B:
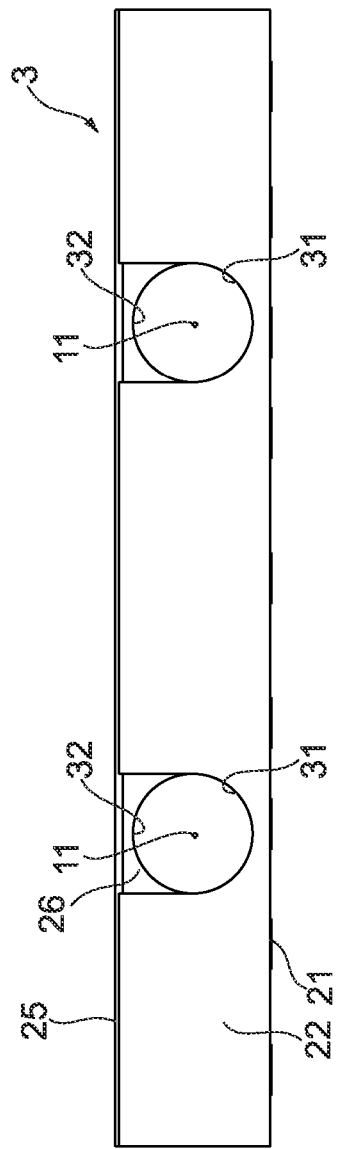
FIG. 3B A side view of the outer cover body for electrical wires according to the third embodiment of the present invention.
Figure 3C:
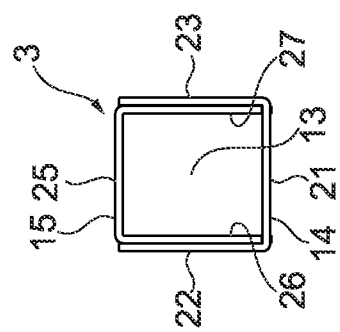
FIG. 3C A front view of the outer cover body for electrical wires according to the third embodiment of the present invention.

As shown in FIGS. 3A-C, in an outer cover body for electrical wires 3 according to the third embodiment, the shape of the branch line through-hole 11 is a substantially circle. In the outer cover body for electrical wires 3, the shape of the first notch 31 is the same form as the shape of the second notch 32. The bottom part of the first notch 31 has a semi-circular arc shape, and forms a lower semi-circle of the branch line through-hole 11 in the shape of a substantially circle. The bottom part of the second notch 32 also has a semi-circular arc shape, and forms an upper semi-circle of the branch line through-hole 11 in the shape of a substantially circle. In the outer cover body for electrical wires 3, since the branch line can be passed to the branch line through-hole 11 without feeding the tip to the branch portion of the branch line successively to the branch line through-hole 11, the work of passing the branch line to the branch line through-hole 11 can also be facilitated.

Thereafter, an outer cover body for electrical wires according to the fourth embodiment of the present invention will be described. It should be noted that the same components as the components constituting the outer cover body for electrical wires according to the first to third embodiments of the present invention will be described using the same reference signs.

As shown in FIGS. 4A-C, in an outer cover body for electrical wires 4 according to the fourth embodiment, the shape of the branch line through-hole 11 is a substantially rectangle. More specifically, in FIGS. 4A and 4B, the shape of the branch line through hole 11 is a rounded rectangle. In the outer cover body for electrical wires 4, the shape of the first notch 31 is the same form as the shape of the second notch 32. In FIGS. 4A and 4B, the shape of the first notch 31 and the shape of the second notch 32 are both substantially rectangular shape.

In the outer cover body for electrical wires 4, the bottom part of the first notch 31 is in the form of a straight line, and forms one side in the longitudinal direction of the rounded rectangle. Both side line parts of the first notch 31 form two opposite sides in the short-side direction of the rounded rectangle. The bottom part of the second notch 32 is in the form of a straight line, and forms another side in the longitudinal direction of the rounded rectangle. Both the side line parts of the second notch 32 overlap both the side line parts of the first notch 31, and form the two opposite sides in the short-side direction of the rounded rectangle. In the outer cover body for electrical wires 4, since the branch line can be passed to the branch line through-hole 11 without feeding the tip to the branch portion of the branch line successively to the branch line through-hole 11, the work of passing the branch line to the branch line through-hole 11 can also be facilitated.

Thereafter, an outer cover body for electrical wires according to the fifth embodiment of the present invention will be described. It should be noted that the same components as the components constituting the outer cover body for electrical wires according to the first to fourth embodiments of the present invention will be described using the same reference signs.

Figure 5A:
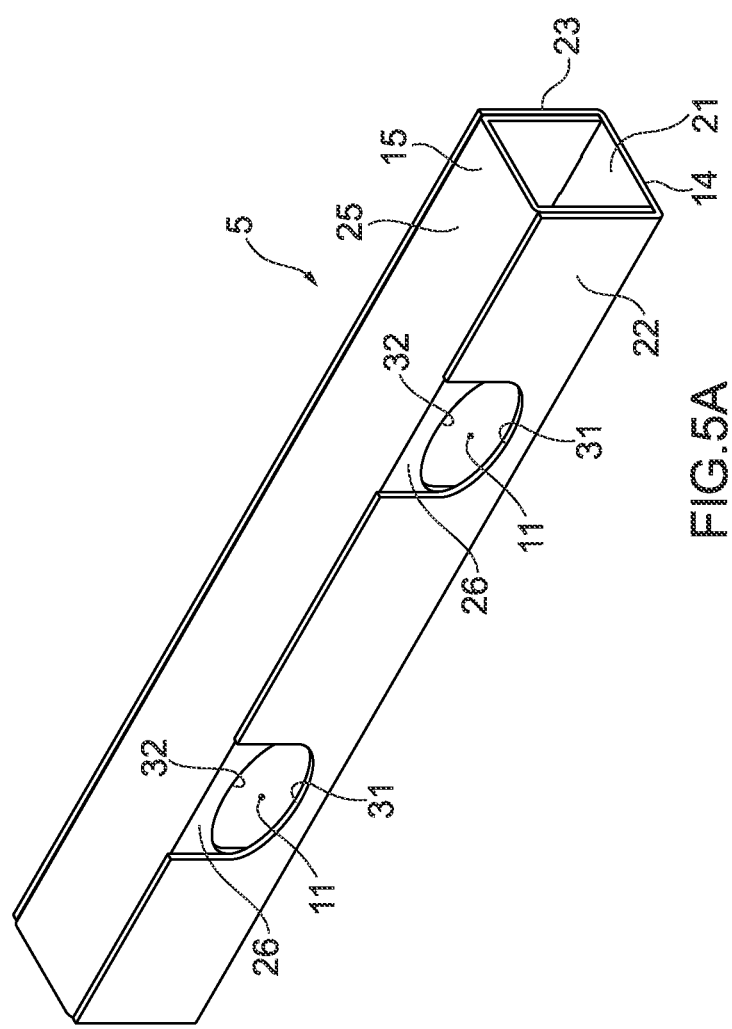
FIG. 5A A perspective view of an outer cover body for electrical wires according to a fifth embodiment of the present invention.
Figure 5B:
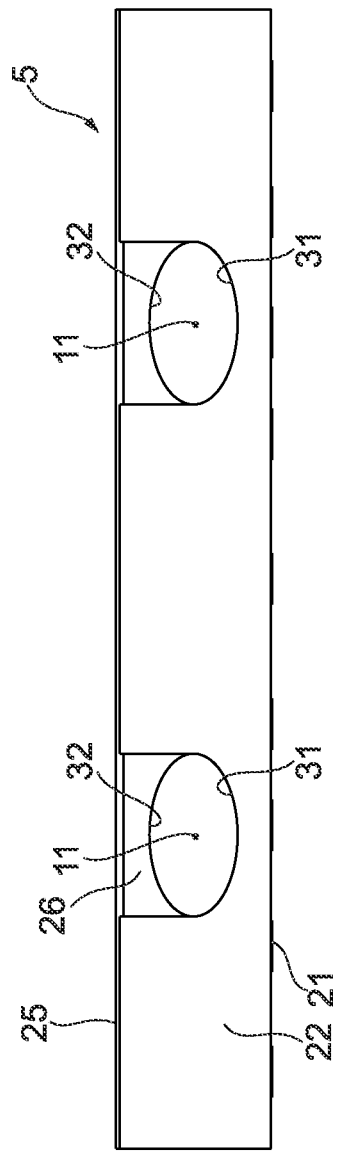
FIG. 5B A side view of the outer cover body for electrical wires according to the fifth embodiment of the present invention.
Figure 5C:
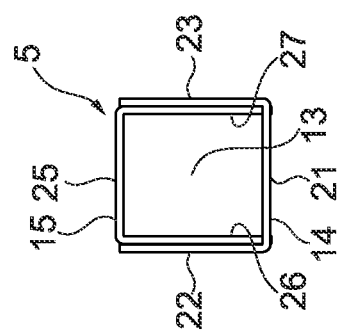
FIG. 5C A front view of the outer cover body for electrical wires according to the fifth embodiment of the present invention.

As shown in FIGS. 5A-C, in an outer cover body for electrical wires 5 according to the fifth embodiment, the shape of the branch line through-hole 11 is a substantially ellipse. In the outer cover body for electrical wires 5, the shape of the first notch 31 is the same form as the shape of the second notch 32. The bottom part of the first notch 31 has a semi-elliptical arc shape, and forms a lower semi-ellipse of the branch line through-hole 11 in the shape of a substantially ellipse. The bottom part of the second notch 32 also has a semi-elliptical arc shape, and forms an upper semi-ellipse of the branch line through-hole 11 in the shape of a substantially ellipse. In the outer cover body for electrical wires 5, since the branch line can be passed to the branch line through-hole 11 without feeding the tip to the branch portion of the branch line successively to the branch line through-hole 11, the work of passing the branch line to the branch line through-hole 11 can also be facilitated.

Thereafter, other embodiment of the present invention will be described. In the outer cover body for electrical wires of each of the above-described embodiments, the branch line through-hole 11 is provided in the wall surface overlapping part of the outer side-wall part 22 and the inner side-wall part 26 of the plurality of wall parts 12. That is, the branch line through-hole 11 is provided in one of the side-wall parts facing each other, but the branch line through-hole 11 may be additionally provided in the wall surface overlapping part of the outer side-wall part 23 and the inner side-wall part 27. That is, the branch line through-holes 11 may be provided in both the side wall parts facing each other. In the outer cover body for electrical wires of each of the above-described embodiments, the wall surface overlapping part is not formed in the bottom wall part 21 and the lid wall part 25, but, instead of this, the wall surface overlapping part may further also be formed in the bottom wall part 21 and/or the lid wall part 25, and the branch line through-hole 11 may also be provided in the wall surface overlapping part.

In the outer cover body for electrical wires of each of the above-described embodiments, the cross-sectional shape in the short-side direction is quadrangular shape, but, the cross-sectional shape in the short-side direction is not particularly limited, and may instead be, for example, a triangle shape or a polygon such as at least a pentagon. In the outer cover body for electrical wires according to each of the above-described embodiments, the plurality of wall parts 12 are formed linearly along the extending direction of the wire harness 110 in conformity with the wire harness 110 that extends substantially linearly, but, instead of this, the plurality of wall parts 12 may be branched to conform to the shape of the wire harness, or bent to conform to the shape of the wire harness, in the middle of the extending direction. The diameter of the accommodating part 13 may be enlarged or reduced to conform to the shape of the wire harness 110.

In the outer cover body for electrical wires of each of the above-described embodiments, the plurality of wall parts 12 are formed from the first wall member 14, and the second wall member 15 that is a separate member from the first wall member 14, but the first wall member 14 and the second wall member 15 may be a one-piece member. For example, the second wall member 15 is eliminated, and the plurality of wall parts 12 are formed by extending the first wall member 14 from the bending portion 20d to the bending portion 20c and further toward the bending portion 20a in a circling manner. In the case where the first wall member 14 is extended to the position of the bending portion 20a, the wall surface overlapping part is formed only in the outer side-wall part 22 and the inner side-wall part 26.

INDUSTRIAL APPLICABILITY

In the present invention, the work of passing the branch line to the branch line through-hole is facilitated, the dimension of the branch line through-hole does not need to be set larger than the external diameter of the branch line, and excellent position control is exhibited over the branch line passed to the branch line through-hole, and therefore the present invention has high utility value, for example, in the field of outer cover body for wire harnesses routed in automobiles.

LIST OF REFERENCE SIGNS

1, 2, 3, 4, 5 outer cover body for electrical wires,
11 branch line through-hole,
13 accommodating part,
22, 23 outer side-wall part,
26, 27 inner side-wall part,
31 first notch,
32 second notch.

The invention claimed is:

1. An outer cover body for electrical wires, the outer cover body for electrical wires being formed by bending a resin sheet and to be attached to an outer periphery of an electrical wire, the outer cover body for electrical wires comprising a plurality of wall parts extending along an extending direction of the electrical wire and forming an accommodating part for accommodating the electrical wire, wherein
at least one of the plurality of wall parts includes a wall surface overlapping part having an outer side wall surface having a first notch, and an inner side wall surface overlapping the outer side wall surface and having a second notch,
wherein a branch line through-hole being formed by overlapping the first notch and the second notch, wherein the outer side wall surface and the inner side wall surface form a first overlapping surface on a first side of the outer cover body and a second overlapping surface on a second side of the outer cover body opposite the first side,
wherein the resin sheet has a structure including a foam layer and a non-foam layer on a front surface of the foam layer, wherein the foam layer and the non-foam layer are integral to the resin sheet, and
wherein the outer cover body and the inner cover body are joined together by an adhesive or a welding provided on the first overlapping surface and the second overlapping surface.

2. The outer cover body for electrical wires according to claim 1, wherein the resin sheet is a thermoplastic resin foam sheet.

3. The outer cover body for electrical wires according to claim 1, wherein the outer side wall surface is a separate member from the inner side wall surface.

4. The outer cover body for electrical wires according to claim 1, wherein an edge portion of the outer side wall surface faces an edge portion of the inner side wall surface along the extending direction of the electrical wire.

5. The outer cover body for electrical wires according to claim 1, wherein the branch line through-hole is not in contact with a bending portion of the resin sheet.

6. The outer cover body for electrical wires according to claim 5, wherein an edge of the branch line through-hole is separated from the bending portion by not less than 5 mm.

7. The outer cover body for electrical wires according to claim 1, wherein a shape of the branch line through-hole is a rhombus, a triangle, a circle, a rectangle, or an ellipse.

8. The outer cover body for electrical wires according to claim 1, wherein a corner portion of the branch line through-hole has a round shape.

9. The outer cover body for electrical wires according to claim 8, wherein the round shape has a curved portion with R (radius) of not less than 2.0 mm.

10. An outer-cover-body-attached wire harness comprising:
one or more electrical wires; and
the outer cover body for electrical wires according to claim 1, wherein
the outer cover body for electrical wires is attached to the outer periphery of the one of more electrical wires.

11. The outer cover body for electrical wires of claim 1, wherein the plurality of wall parts further includes a bottom wall part between the outer side wall surface and the inner side wall surface,
wherein the bottom wall part comprises a first bending portion on the first side of the outer cover body and a second bending portion on the second side of the outer cover body.

12. The outer cover body for electrical wires of claim 1, wherein the inner side wall surface is in direct contact with the outer side wall surface at a location on the first side of the outer cover body across the first overlapping surface, and
the inner side wall surface is further in direct contact with the second side of the outer cover body at a location across the second overlapping surface.

* * * * *